(12) United States Patent
Whitley et al.

(10) Patent No.: US 8,046,857 B2
(45) Date of Patent: Nov. 1, 2011

(54) DOCK LEVELER SEALS AND ASSOCIATED METHODS AND SYSTEMS

(75) Inventors: L. Blake Whitley, Arlington, TX (US); William C. Eungard, Waterford, WI (US); Michael Story, Denton, TX (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 107 days.

(21) Appl. No.: 12/424,379

(22) Filed: Apr. 15, 2009

(65) Prior Publication Data

US 2010/0264596 A1    Oct. 21, 2010

(51) Int. Cl.
*E01D 1/00* (2006.01)
*F16J 15/02* (2006.01)

(52) U.S. Cl. ............... 14/69.5; 277/921; 277/637

(58) Field of Classification Search ........ 14/2.4, 14/69.1, 71.1; 277/630, 637, 640, 905, 921; 16/250, 251
See application file for complete search history.

(56) References Cited

U.S. PATENT DOCUMENTS

| | | | | |
|---|---|---|---|---|
| 2,504,635 | A * | 4/1950 | Bradley | 16/223 |
| 3,075,234 | A * | 1/1963 | Speakman | 16/250 |
| 4,286,410 | A * | 9/1981 | Hahn | 49/33 |
| 4,293,969 | A | 10/1981 | Frommelt | |
| 4,422,199 | A | 12/1983 | Frommelt | |
| 4,557,008 | A | 12/1985 | Jurden | |
| 4,682,382 | A | 7/1987 | Bennett | |
| 4,711,059 | A * | 12/1987 | Layne | 52/173.2 |
| 4,744,121 | A | 5/1988 | Swessel et al. | |
| 4,945,606 | A * | 8/1990 | Eckel | 16/313 |
| 5,001,799 | A | 3/1991 | Alexander et al. | |
| 5,088,143 | A | 2/1992 | Alexander | |
| 5,313,681 | A | 5/1994 | Alexander | |
| 5,396,676 | A | 3/1995 | Alexander et al. | |
| 5,442,825 | A * | 8/1995 | Hahn et al. | 14/71.1 |
| 5,475,888 | A | 12/1995 | Massey | |
| 6,073,402 | A | 6/2000 | Moody | |
| 6,125,491 | A | 10/2000 | Alexander | |

(Continued)

FOREIGN PATENT DOCUMENTS

AU    2006230657 A1    5/2007

(Continued)

OTHER PUBLICATIONS

Frommelt VHLS Vertical Under-leveler Seal, Installation Instructions, Frommelt Products Corporation, Pub. No. VHLS-0003, May 2007, 16 pages.

Frommelt VHL Under-leveler Seal (Model VHLS), Architectural Specifications, 2 pages.

(Continued)

*Primary Examiner* — Thomas Will
*Assistant Examiner* — Abigail A Risic

(57) ABSTRACT

Dock leveler seals and associated methods and systems are described herein. A dock leveler having a rear hinge seal configured in accordance with one embodiment of the disclosure includes a rear support frame and a movable deck. The rear support frame includes a plurality of first support members extending therefrom, and the aft edge portion of the deck includes a plurality of second support members pivotally coupled to the first support members along an axis. The seal of this embodiment includes a first edge portion extending outwardly from a medial portion in a first direction, and a second edge portion extending outwardly from the medial portion in a second direction. The medial portion urges the first edge portion against the support frame and the second edge portion against the aft edge portion of the deck as the deck pivots about the axis in operation.

21 Claims, 6 Drawing Sheets

U.S. PATENT DOCUMENTS

| | | | |
|---|---|---|---|
| 6,276,026 B1 * | 8/2001 | Wille | 16/250 |
| 6,442,783 B1 | 9/2002 | Yoon et al. | |
| 6,502,268 B2 | 1/2003 | Ashelin et al. | |
| 6,654,976 B2 | 12/2003 | Digmann et al. | |
| 6,810,817 B1 | 11/2004 | James | |
| 6,948,285 B2 * | 9/2005 | Miller et al. | 52/173.2 |
| 7,146,673 B1 | 12/2006 | Digmann et al. | |
| 7,162,762 B1 | 1/2007 | Gleason | |
| 7,213,285 B2 * | 5/2007 | Mitchell | 14/69.5 |
| 7,216,391 B2 * | 5/2007 | Muhl et al. | 14/71.1 |
| 7,230,819 B2 | 6/2007 | Muchow et al. | |
| 7,334,281 B2 | 2/2008 | Digmann et al. | |
| 7,363,670 B2 * | 4/2008 | Mitchell et al. | 14/71.1 |
| 2007/0101517 A1 | 5/2007 | Digmann et al. | |
| 2007/0101518 A1 | 5/2007 | Digmann et al. | |
| 2008/0052843 A1 | 3/2008 | Eungard et al. | |
| 2009/0165224 A1 * | 7/2009 | Digmann et al. | 14/71.1 |
| 2010/0031457 A1 | 2/2010 | Gleason et al. | |

FOREIGN PATENT DOCUMENTS

| | | |
|---|---|---|
| WO | WO-9410073 A1 | 5/1994 |
| WO | WO-2007056744 A1 | 5/2007 |
| WO | WO-2007076507 A2 | 7/2007 |

OTHER PUBLICATIONS

Frommelt VHLS Under-leveler Seal for Vertical Hydraulic Leveler, Rite-Hite Holding Corporation, 1 page [Internet accessed Aug. 28, 2007].

International Search Report and Written Opinion for PCT/US2010/046531; Applicant: 4 Front Engineered Solutions, Inc.; Date of Mailing: Oct. 19, 2010, 9 pages.

Kelley Weatherseal Installation Instructions '4 Series' Dockboard, Kelley Company, Inc., Doc. No. 5164, 2 pages, Mar. 2, 1981.

Kelley aFX/aFX-S Dock Leveler Safe T Frame, User's Manual, Installation, Operations, Maintenance and Parts, 4Front Engineered Solutions, Inc., 48 pages, 2008.

Dock Leveler Weatherseals, Rite Hite Corp., 2008, 3 pages.

Kelley Weatherseal Installation, Kelley Company, Inc., Doc. No. 5141, 1 page, Aug. 2, 1978.

Frommelt PitMaster Under-Leveler Seal, Rite Hite Corp., 2 pages, 2008.

Drawing No. 707-312 Rear Hinge w/s Assembly, Kelly Company, Inc., 1 page, Nov. 15, 2008.

Weatherseal Installation Intructions, 4Front Engineered Solutions, Inc., Doc No. AP5225 RA 06/11, p. 3, 2011.

* cited by examiner

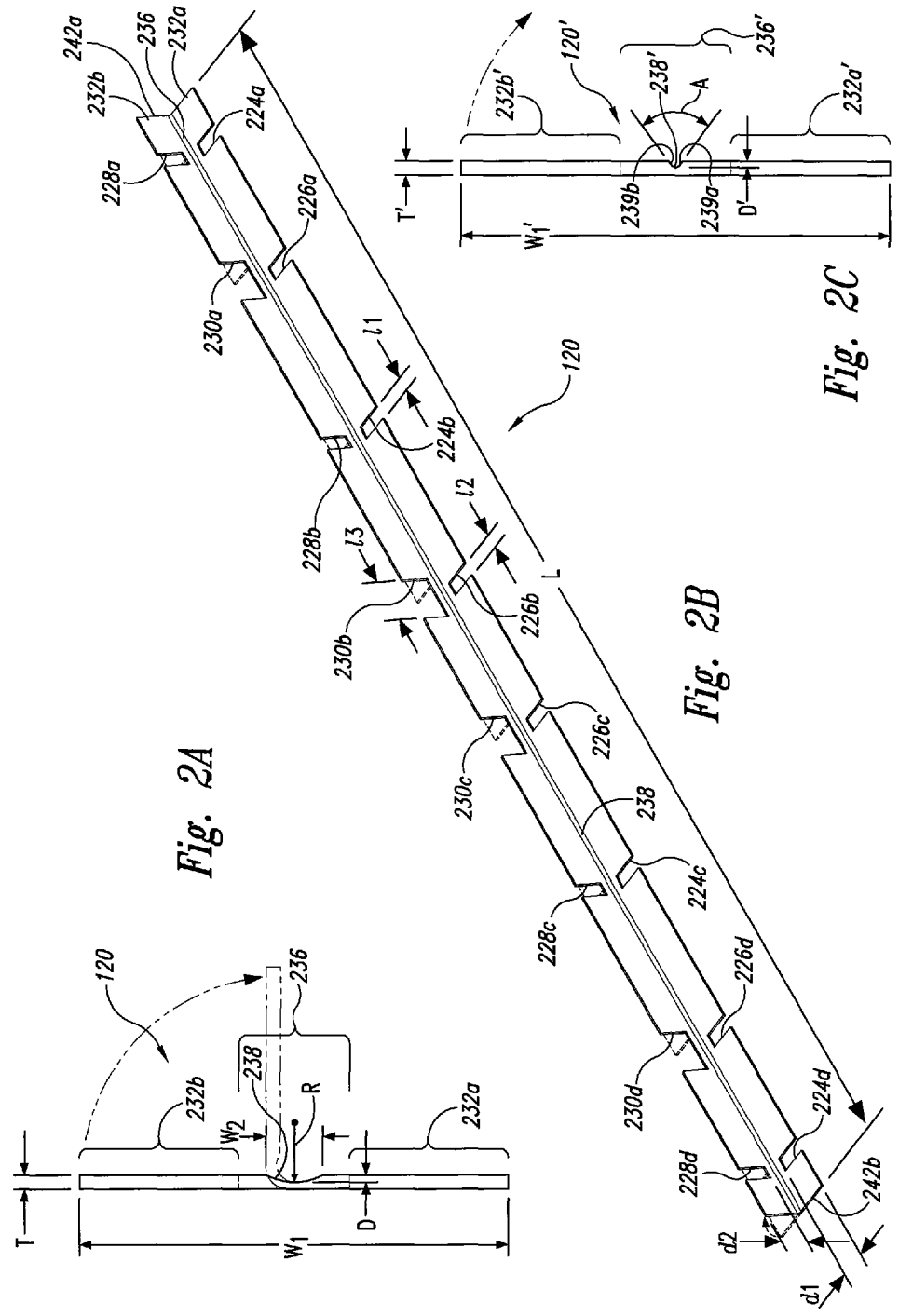

DOCK LEVELER SEALS AND ASSOCIATED METHODS AND SYSTEMS

TECHNICAL FIELD

The following disclosure relates generally to loading dock levelers and, more particularly, to dock leveler seals and associated methods of manufacture and use.

BACKGROUND

Warehouses, manufacturing facilities, and large retail outlets typically include one or more loading docks for transferring goods to and from trucks, trailers, or other freight vehicles. Conventional loading docks usually consist of an exterior opening in a side of a building. The opening is typically covered by a roll up door, and is usually positioned a few feet above the ground to be approximately level with the beds of trailers and other freight vehicles.

To load or unload goods from a trailer, the doors on the aft end of the trailer are opened and the trailer is backed up to the loading dock opening. Some loading docks include a dock leveler with a movable deck or ramp to adjust for any misalignment between the floor of the loading dock and the bed of the trailer. The aft edge of conventional dock leveler decks is typically attached to a hinge structure mounted to the floor of the loading dock or to a rear wall of a dock leveler pit. The forward edge of the deck typically carries a pivoting lip that hangs pendant until extended outwardly to engage the bed of a trailer. With the vehicle in position and the loading dock door raised, the deck pivots upwardly about the rear hinge to allow the lip to be extended, and then downwardly toward the open end of the trailer until the lip comes to rest on the bed. Workers, fork lifts, etc. can then move into and out of the trailer to load and/or unload cargo. The dock leveler can move up and down as needed to accommodate any movement of the bed resulting from the loading and/or unloading of cargo.

Many loading docks include a compressible dock seal or shelter that extends around the top and sides of the loading dock opening. The purpose of the seal is to reduce or eliminate gaps that exist between the aft end of the trailer and the loading dock opening when the dock door is open. These gaps can allow undesirable elements (e.g., rain, snow, warm/cold outside air, debris, etc.) to enter the building and/or the trailer resulting in energy losses, undesirable working conditions, spoiled goods, and/or other deleterious effects.

Deployed and/or stored dock levelers, however, can also create leak paths that allow outside air, debris, and/or other undesirable elements to flow into or out of the building or trailer when the dock doors are open or closed. For example, gaps often exist between the sides of the deck lip and the trailer bumpers positioned on opposite sides of the loading dock opening. In addition, outside air and debris can sometimes flow under the front of the deck and pass upwardly into the building through gaps between the deck and the rear and side walls of the deck pit. In the past, conventional bulb seals have been used in these areas.

SUMMARY

The following summary is provided for the benefit of the reader only, and does not limit the invention as set forth in the claims in any way.

The following disclosure is directed generally to seals for use with dock levelers. A loading dock leveler configured in accordance with one aspect of the disclosure includes a support structure and a movable deck. The support structure is configured to be fixedly positioned in a dock leveler pit at least proximate to a rear wall of the pit, and includes a plurality of first support members. The movable deck has an aft edge portion that includes a plurality of second support members pivotally coupled to the first support members along an axis. In operation, the deck is pivotable about the axis between a lower position in which a front edge portion of the deck is positioned proximate the dock leveler pit and an upper position in which the front edge portion is positioned above the dock leveler pit.

The loading dock leveler of this embodiment further includes a resilient seal positioned between the support structure and the aft edge portion of the deck. The seal includes a medial portion extending longitudinally between first and second end portions. The seal further includes a first edge portion extending outwardly from the medial portion in a first direction, and a second edge portion extending outwardly from the medial portion in a second direction. When in position, the medial portion urges the first edge portion against the support structure and the second edge portion against the aft edge portion of the deck, throughout the range of deck motion including when the deck is in the lower position and when the deck is in the upper position.

A method for sealing any elongate gap between a first dock leveler structure and a second dock leveler structure in accordance with another aspect of the disclosure includes providing a substantially flat seal. The seal includes a medial portion extending longitudinally between first and second end portions, a first edge portion extending outwardly from the medial portion in a first direction, and a second edge portion extending outwardly from the medial portion in a second direction. The method further includes bending the seal about the medial portion to move the first edge portion toward the second edge portion, and releasing the seal in the elongate gap with the first edge portion pressing against the first dock leveler structure and the second edge portion pressing against the second dock leveler structure. In one embodiment of this method, the first dock leveler structure can be a support frame and the second dock leveler structure can be a deck that is pivotally coupled to the support frame.

BRIEF DESCRIPTION OF THE DRAWINGS

FIG. 2A is a cross-sectional end view of a loading dock deck seal configured in accordance with an embodiment of the disclosure, FIG. 2b is an isometric view of the deck seal of FIG. 2A in an installed configuration, and FIG. 2C is a cross-sectional end view of a deck seal configured in accordance with another embodiment of the disclosure.

DETAILED DESCRIPTION

The following disclosure describes various embodiments of dock levelers and dock leveler seal systems, and associated methods of manufacture and use. Certain details are set forth in the following description and in FIGS. 1A-5 to provide a thorough understanding of various embodiments of the disclosure. Other details describing well-known structures and systems often associated with dock levelers, dock leveler seals, etc., have not been set forth in the following disclosure to avoid unnecessarily obscuring the description of the various embodiments of the disclosure.

Many of the details, dimensions, angles and other features shown in the Figures are merely illustrative of particular embodiments of the disclosure. Accordingly, other embodiments can have other details, dimensions, angles and features without departing from the spirit or scope of the present disclosure. In addition, those of ordinary skill in the art will appreciate that further embodiments of the disclosure can be practiced without several of the details described below.

In the Figures, identical reference numbers identify identical or at least generally similar elements. To facilitate the discussion of any particular element, the most significant digit or digits of any referenced number refer to the Figure in which that element is first introduced. For example, element 110 is first introduced and discussed with reference to FIG. 1.

Figure 1A:
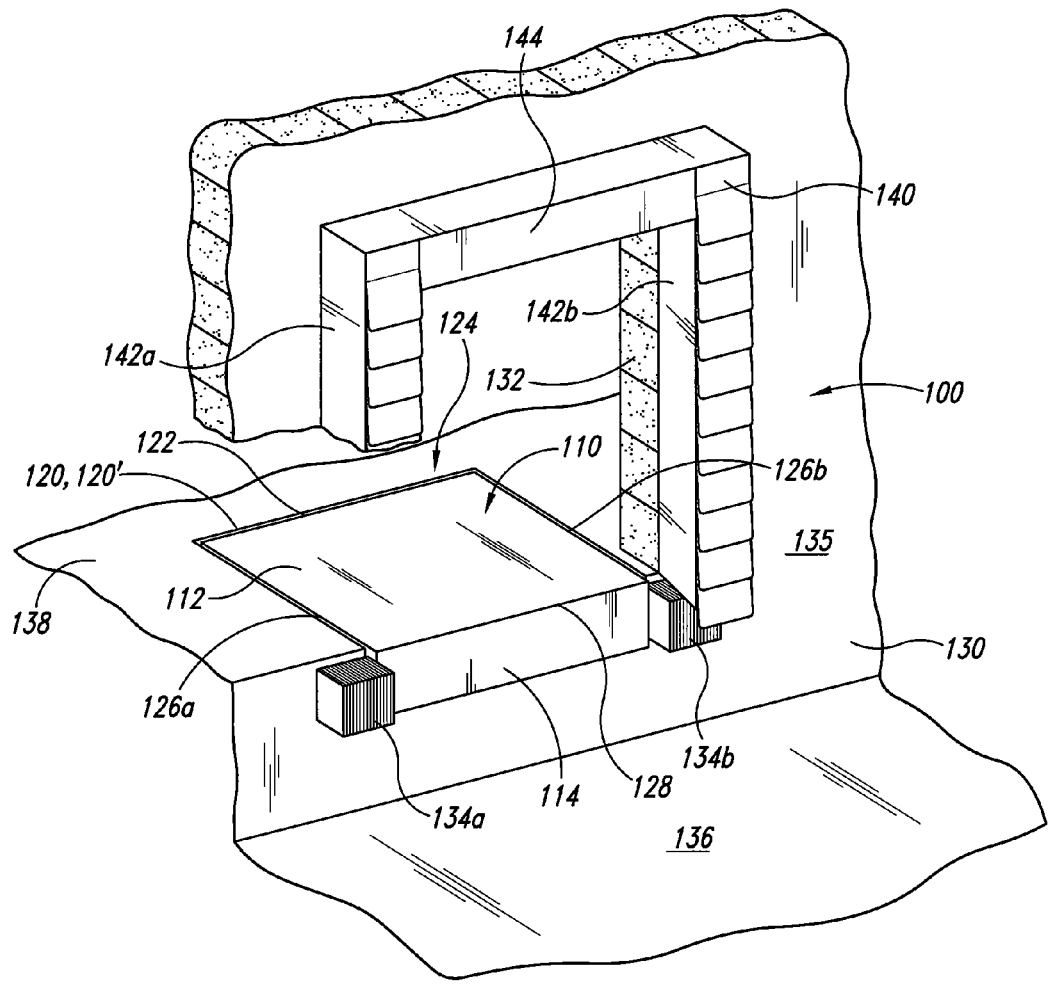
FIGS. 1A and 1B are partially cutaway isometric views of a loading dock having a dock leveler with a rear seal configured in accordance with an embodiment of the disclosure.
Figure 1B:
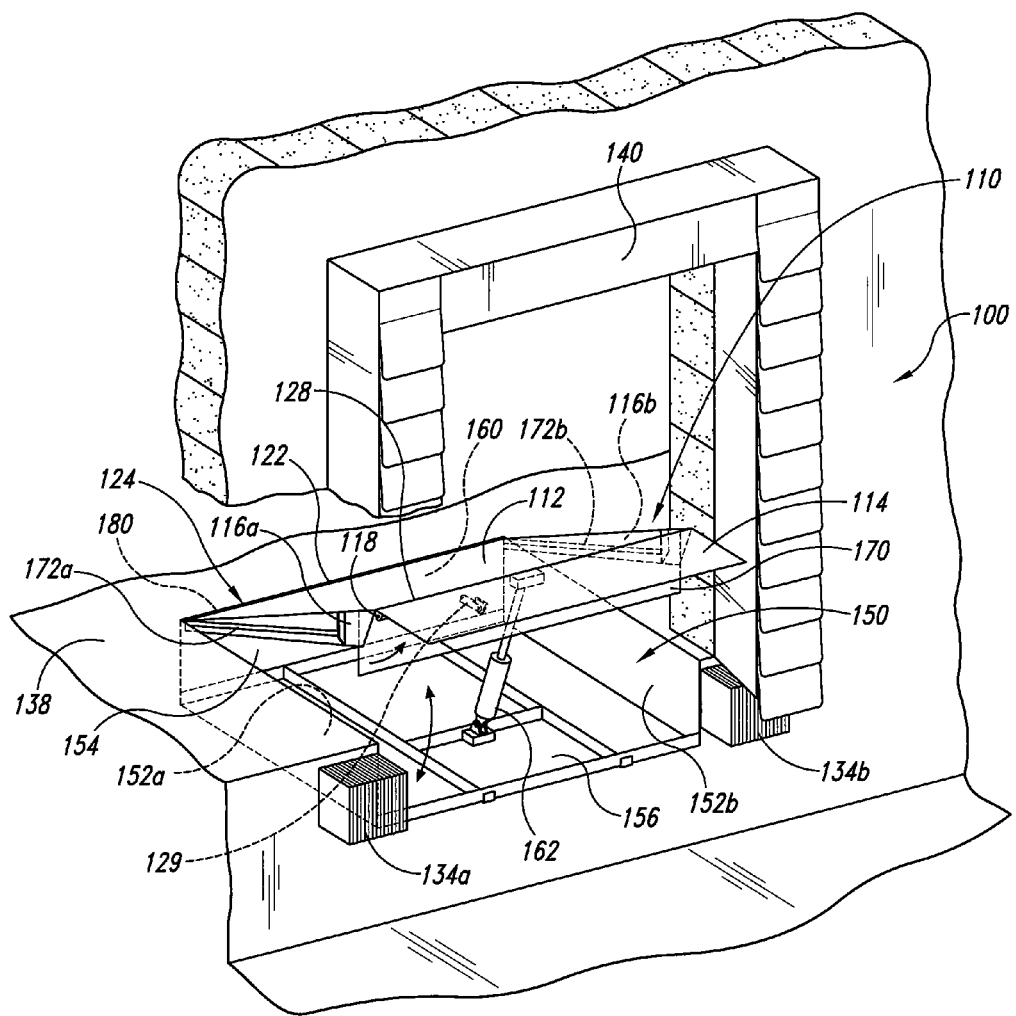

FIG. 1A is a partially cutaway isometric view illustrating a loading dock 100 having a dock leveler 110 with a rear deck seal 120 configured in accordance with an embodiment of the disclosure. FIG. 1B is a similar view illustrating the dock leveler 110 in a raised position. Referring first to FIG. 1A, in the illustrated embodiment the loading dock 100 includes an opening 132 formed in an exterior wall 135 of a warehouse or other building 130. The opening 132 can be at least generally similar in size and shape to conventional trailer truck openings having, for example, a width of about 8 feet and a height of about 9 feet. In other embodiments, however, the opening 132 can have other sizes, shapes and/or dimensions depending on the type of vehicle or vehicles the loading dock is designed to accommodate and/or other factors.

Although not shown in FIG. 1A, the opening 132 can be temporarily closed with various types of doors known in the art. Such doors can include, for example, suitable overhead doors, sliding doors, etc. The loading dock 100 can also include bumpers 134 (e.g., rubber bumpers; identified individually as a first bumper 134a and a second bumper 134b) attached to the exterior wall 135 of the building 130 proximate to the lower corners of the opening 132. The bumpers 134 can help absorb the impact from shipping trailers and other vehicles as they back into the loading dock 100. In the illustrated embodiment, the opening 132 can be positioned at a height of from about 46 inches to about 56 inches above a driveway 136, and the driveway 136 can have a grade of from about 0% to about +/−4%. As those of ordinary skill in the art will appreciate, however, the foregoing characteristics of the loading dock 100 are merely representative of possible embodiments. Accordingly, the various aspects of the dock leveler seals described in detail below can be employed with a wide variety of loading docks and loading dock levelers without departing from the present disclosure.

In the illustrated embodiment, a dock seal 140 is positioned around the opening 132 to provide a seal between the aft end of trailers and other freight vehicles during the loading and unloading process. Although a wide variety of dock seals can be used with the present disclosure (or omitted), in the illustrated embodiment the dock seal 140 includes a first side pad 142a extending vertically along a first side portion of the opening 132, and a second side pad 142b extending vertically along a second side portion of the opening 132 opposite the first side portion. A head pad 144 extends horizontally across a top portion of the opening 132 between the first side pad 142a and the second side pad 142b. The side pads 142 and the head pad 144 can include a compressible core material (e.g., polyurethane foam, etc.) covered by a durable covering (e.g., a commercially-available coated fabric, such as a polyurethane, neoprene, or vinyl-coated fabric, for instance vinyl-coated polyester fabric). In addition to the foregoing features, each of the side pads 142 can also include a plurality of overlapping pleats or flaps constructed of durable and resilient materials such as, for example, vinyl-coated polyester fabric. In operation, the side pads 142 and the head pad 144 conform to the aft end of the trailer (not shown) as it presses up against the pads, which helps to seal the gaps between the aft end of the trailer and the side of the building 130. The flaps can help reduce damage to the side pads 142 from abrasion caused by movement of the trailer during, for example, the unloading/loading process.

Referring next to FIGS. 1A and 1B together, the dock leveler 110 includes a movable ramp or deck 112 having an aft edge portion 122 pivotally coupled to a hinge support structure 160 about a second hinge axis 180. In the illustrated embodiment, the support structure 160 is fixedly attached to a rear wall 154 of a dock leveler pit 150 formed in a floor 138 of the building 130. In addition to the rear wall 154, the dock leveler pit 150 usually includes a base 156 extending between a first side wall 152a and a second side wall 152b.

A suitable actuator or deck lifting mechanism 162 is operably coupled to the underside of the deck 112. The deck lifting mechanism 162 can include various types of known systems for raising the deck 112 from a first position in which a forward edge portion 128 of the deck 112 is positioned proximate the dock pit 150 as shown in FIG. 1A, to a second position in which the forward edge portion 128 of the deck 112 is positioned above the dock pit 150 as shown in FIG. 1B. The deck lifting mechanism 162 can also lower the forward edge portion 128 of the deck 112 to a position below the building floor 138 if needed, for example, to accommodate a trailer bed (not shown) that is positioned below the floor 138. Such deck lifting systems can include, for example, various types of mechanical, electrical, hydraulic, pneumatic, and/or other suitable deck lifting mechanisms known the art. Various types of suitable deck lifting mechanisms are known in the art, and any suitable system can be employed with the embodiments of the present disclosure.

In the illustrated embodiment, the dock leveler 110 can further include a first side member 116a extending downwardly from a first side edge portion 126a of the deck 112, and a corresponding second side member 116b extending downwardly from the opposing second side edge portion 126b of the deck 112. The side members 116 can serve as toe guards within the working range of the dock leveler 110. In addition, a movable deck lip 114 is pivotally attached to a forward edge portion 128 of the deck 112 about a first hinge axis 118.

In operation, a trailer or other freight vehicle (not shown) backs up against the bumpers 134 to compress the open aft end of the trailer against the dock seal 140. After the dock door is opened, an operator (also not shown) activates the lifting mechanism 162 to pivot the deck 112 upwardly to, for example, the position shown in FIG. 1B. The operator then rotates the deck 112 downwardly. A suitable lip lifting mechanism 129 pivots the lip 114 outwardly about the first hinge line 118. The lip lifting mechanism 129 can include various types of suitable mechanical, pneumatic, hydraulic, and/or manual systems known in the art. As the deck 112 continues moving downwardly, the lip 114 ultimately comes to rest on the bed of the trailer. In this position, the deck 112 will often be at a slight angle above the floor 138 of the loading dock 100, but could also be lower than the floor 138 if needed to accommodate the position of the particular trailer bed.

As described in greater detail below, the seal 120 is installed in a gap 124 between the aft edge portion 122 of the deck 112 and the support structure 160. As shown in FIG. 1B, the dock leveler 110 can also include one or more seals for sealing the gaps that may exist between the side members 116 and the side walls 152 of the pit 150, as well as sealing the front opening in the pit 150 beneath the deck 112. For example, in various embodiments the dock leveler 110 can include one or more flexible and/or compressible side seals 172 (identified individually as first side seals 172a and second side seals 172b) adhesively bonded, fastened (e.g., with a metal cap strip or channel, hook and loop fabric, etc.), or otherwise attached to the side members 116. The seals 172 can have a wide variety of cross-sectional shapes, including bulb shapes, teardrop shapes, tapered blade and flap shapes, rectangular shapes, triangular shapes, etc., and can be made from various types of materials known in the art, including various types of rubber, vinyl, fibers, foam, etc. For example, in some embodiments the seals 172 can have a compressible inner foam core wrapped in a durable fabric, such as vinyl or vinyl covered fabric. The side members 116 can also carry one or more brush seals (e.g., nylon brush seals) alone or in combination with the seals 172 (for example, above and/or below the seals 172), as brush seals can help keep rodents and other pests out of the building. In this manner, the flexible seals 172 can compress and conform against the side walls 152 when the deck 112 is deployed and seal all or at least a portion of the gaps that may exist between the side walls 152 and the side members 116. In other embodiments, the dock leveler 110 can include the Toe Guard Weatherseal product provided by 4Front Engineered Solutions, Inc. of 1612 Hutton Drive, Suite 140 Carrollton, Tex. 75006; and/or brush seals from Memtech, Inc., 9033 General Drive, Plymouth, Mich. 48170; and/or one or more of the seals described in U.S. Pat. No. 5,442,825. The disclosures of U.S. Pat. No. 5,442,825, the Memtech publication entitled "Custom Brush Seals—Installing Dock Leveler Seals," and the Kelley Company publication entitled "Details of Side Weatherseal Mounting," Copyright 1978, are incorporated herein in their entireties by reference.

Similarly, the forward end of the leveler pit 150 can be sealed off or at least partially sealed off with a suitable front seal 170 that extends downwardly from the underside of the deck 112 and contacts the base pit 156 when the deck lip 114 is lowered onto the bed of the trailer. Conversely, the front seal 170 could extend upwardly from the base pit 156 toward the underside of the deck 112 when the deck lip 114 is lowered onto the bed of the trailer. Various types of suitable front seals and other seals are disclosed in, for example, U.S. Patent Application Publication No. 2008/0052843 (now U.S. Pat. No. 7,594,290), U.S. Patent Application Publication No. 2007/0101518 (now U.S. Pat. No. 7,584,517), U.S. Pat. Nos. 4,682,382, 5,784,740, 6,654,976, 5,396,676, and 7,334,281, and each of these patents and patent applications is incorporated herein in its entirety by reference.

FIG. 2A is an enlarged end view of the deck seal 120 in a relaxed or free state prior to installation, and FIG. 2B is an isometric view of the deck seal 120 after it has been formed or bent around an intermediate or medial portion 236 for installation in a dock leveler gap in accordance with an embodiment of the disclosure. Referring first to FIG. 2A, in the illustrated embodiment the seal 120 lays generally flat prior to installation, and can have a generally rectangular cross-section with an overall width W1 and a thickness T. In one embodiment, the width W1 can be from about 2 inches to about 8 inches, such as from about 3 inches to about 6 inches, depending upon the particular sealing application, gap size, etc. In one embodiment, for example, the width W1 can be about 4 inches or 4.08 inches. In other embodiments, the seal 120 can have other widths W1. The seal thickness T can be from about 0.04 inch to about 0.3 inch, such as from about 0.06 inch to about 0.2 inch, again depending on the particular sealing application, seal material, etc. For example, in one embodiment the seal thickness T can be about 0.18 inch. In other embodiments, the seal 120 can have other thicknesses T.

In another aspect of this embodiment, the seal 120 includes a first side or edge portion 232a extending outwardly from the medial portion 236 in a first direction, and a second side or edge portion 232b extending outwardly from the medial portion 236 in a second direction. The medial portion 236 can include an undercut region or groove 238 that extends to a depth D below a surface of the seal 120. In the illustrated embodiment, the groove 238 can have a radius R of from about 0.25 inch to about 1.5 inch, such as from about 0.4 inch to about 1 inch, depending on the particular sealing application, seal material, desired preload in the medial portion 236 after bending, etc. For example, in one embodiment the radius R can be about 0.7 inch or 0.65 inch. Moreover, the groove 238 can have a width W2 of from about 0.1 inch to about 1 inch, such as from about 0.25 inch to about 0.75 inch. For example, in one embodiment the groove region width W2 can be about 0.5 inch. The groove depth D can be from about 0.01 inch to about 0.15 inch, such as from about 0.03 inch to about 0.1 inch, depending on the type of seal material, the seal thickness T, as well as other factors and considerations. In one embodiment, for example, the groove depth D can be from about 0.04 to about 0.05 inch. As those of ordinary skill in the art will appreciate, the foregoing dimensions of the seal 120 are representative of only some embodiments of the present disclosure. Accordingly, other embodiments within the scope of the present disclosure can have other shapes, sizes, and/or other features.

Referring next to FIG. 2B, the first edge portion 232a includes a plurality of first recesses 224 (identified individually as first recesses 224a-d) and a plurality of second recesses 226 (identified individually as second recesses 226a-d). In the illustrated embodiment, the first recesses 224 and the second recesses 226 form cut-outs or notches in the outer edge of the first edge portion 232a. As described in greater detail, these recesses are configured to fit around corresponding structures or features on the support structure 160 (FIG. 1B) when the seal 120 is fitted into position in the gap 124 between the aft edge portion 122 of the deck 112 and the support structure 160. Similarly, the second edge portion 232b includes a plurality of third recesses 228 (identified individually as third recesses 228a-d) and a plurality of fourth recesses 230 (identified individually as fourth recesses 230a-d). The third recesses 228 and the fourth recesses 230 are configured to fit around corresponding structures or features on the underside of the deck 112 (FIG. 1B). Accordingly, the size, position, and/or shape of the recesses 224, 226, 228 and 230 can vary depending on the corresponding structural features of the support structure 160 and/or the aft edge portion 122 of the deck 112.

In the illustrated embodiment, for example, the first recesses 224 and the third recesses 228 can have a length l1 of from about 0.38 inch to about 1.25 inches, such as about 0.88 inch, and the second recesses 226 can have a length l2 of from about 0.75 inch to about 1.75 inches, such as about 1.25 inches. The fourth recesses 230 can have a length l3 of from about 1.5 inches to about 3.25 inches, such as about 2.5 inches. In addition, in this embodiment the first recesses 224 and the second recesses 226 can extend for a depth d1 into the first edge portion 232a of from about 1 inch to about 2 inches, such as about 1.5 inches. Similarly, the third recesses 228 and the fourth recesses 230 can have a depth d2 of from about 1 inch to about 2 inches, such as about 1.5 inches. Those of ordinary skill in the art will appreciate, however, that in other embodiments one or more of the recesses 224, 226, 228 and/or 230 can have other shapes, sizes, depths, spacing, etc. depending on the particular structure or structures to which the seal 120 will be mounted or installed. In yet other embodiments, one or more of the recesses 224, 226, 228 and/or 230 can be omitted. Indeed, in yet another embodiment, all of the recesses 224, 226, 228 and/or 230 can be omitted.

The seal 120 can have an overall length L that accommodates the width of the particular gap to be sealed. For example, in the illustrated embodiment the seal 120 can have an overall length L between a first end portion 242a and a second end portion 242b of from about 70 inches to about 100 inches, or about 84.75 inches. In other embodiments, the seal 120 can have other lengths.

In the illustrated embodiment, the seal 120 is a unitary, one-piece member that is configured to extend the full length of the rear hinge gap 124 from the first side edge portion 126a of the deck 112 to the second side edge portion 126b (FIG. 1A). In other embodiments, however, other seals at least generally similar in structure and function to the seal 120 can be produced from multiple members. For example, as described in greater detail below, in one embodiment the medial portion 236a can be produced from a first material (e.g., a rigid or semi-rigid material), and the edge portions 232a and 232b can be manufactured from a second material (e.g., a resilient or less rigid material).

Prior to installation in a gap (for example, the aft gap 124 shown in FIG. 1A), the seal 120 is bent about the medial portion 236 by pressing the first edge portion 232a toward the second edge portion 232b. In the illustrated embodiment, the seal 120 is bent with the groove 238 on the inside of the bend, but in other embodiments, the groove 238 can be positioned on the outside of the bend. As described in greater detail below, bending the seal 120 in this manner preloads a spring force in the medial portion 236 that urges or biases the edge portions 232a and 232b outwardly against adjacent structure to hold the seal 120 in the gap 124 when released by the installer(s). If the seal 120 is not held in the bent position as shown in FIG. 2B, the seal 120 tends to return to its initial, flat shape as shown in FIG. 2A. In the illustrated embodiment, the groove 238 is positioned on the inside of the bent region to facilitate bending of the seal 120. In other embodiments, however, the groove 238 can be positioned on the outside of the bent region, on both sides of the bent region, or the groove 238 can be omitted. In still further embodiments, it is contemplated that the medial portion 236 can include a built-up or raised region about which the seal 120 can be bent or otherwise formed for preloading prior to installation.

FIG. 2C is an enlarged end view of a deck seal 120' configured in accordance with another embodiment of the disclosure. The deck seal 120' can be at least generally similar in structure and function to the deck seal 120 described above. For example, the seal 120' lays generally flat prior to installation, and can have a generally rectangular cross-section with an overall width W1' and a thickness T'. In one embodiment, the width W1' can be from about 2 inches to about 8 inches, such as from about 3 inches to about 6 inches, or about 4 inches. The thickness T' can be from about 0.04 inch to about 0.3 inch, such as from about 0.06 inch to about 0.2 inch, or about 0.12 inch. In other embodiments, the seal 120' can have other widths W1' and/or other thicknesses T'. Like the seal 120 discussed above, the seal 120' also includes a first side or edge portion 232a' extending outwardly from a medial portion 236' in a first direction, and a second side or edge portion 232b' extending outwardly from the medial portion 236' in a second direction.

In the embodiment of FIG. 2C, however, the medial portion 236' includes a groove or notch 238' that forms a "V" shape and can extend for the length of the seal 120'. More particularly, in the illustrated embodiment the notch 238' has sides 239a and 239b which are set at angles of 45 degrees relative to a surface of the seal 120' and, accordingly, form an angle A of about 90 degrees therebetween. In other embodiments, the notch 238' can form other angles A, such as angles of from about 60 degrees to about 130 degrees. The notch 238' can be cut with router, cast, or otherwise formed to a depth D' below a surface of the seal 120'. In the illustrated embodiment, the depth D' can be about ½ of the seal thickness T'. For example, if T' is about 0.12 inch, then D' can be about 0.06 inch. In other embodiments, D' can have other values, such as from about 0.01 inch to about 0.15 inch, depending on the type of seal material, the seal thickness T', etc.

The seals 120 and 120' can be manufactured from a number of different types of suitably resilient, flexible, compressible, elastic, and/or other materials. For example, in one embodiment the seals 120 and 120' can be manufactured from a sheet (e.g., an extruded sheet, molded sheet, die-cut sheet, etc.) of elastomeric material, such as polyurethane rubber, vinyl, etc. In another embodiment, the seals can be manufactured from polyester material, such as two-ply polyester material sold under the specification number 2EDS 5m-5m eFH/AD Black by the Derco Company of 01-309 Warszawa, Poland. In yet another embodiment, the seals 120 and 120' can be manufactured from a vinyl covered fabric, such as a 100 ounce weight vinyl covered fabric. In some embodiments, the vinyl covered fabric can be a laminate of fabric and vinyl, such as a laminate that includes in successive order: a first outer layer of vinyl, a first inner layer of base fabric, a second inner layer of vinyl that is thicker than the first outer layer of vinyl, a third inner layer of base fabric, and a second outer layer of vinyl that is about the same thickness as the first outer layer of vinyl. In further embodiments, however, other laminates of vinyl, fabric and/or other materials can be used. In general, the seals 120 and 120' can be manufactured from any suitable material that exhibits sufficient memory and spring-back including, for example, suitable polymeric materials, elastomeric materials, rubber, vinyl, and/or metallic materials (e.g., spring steel). In other embodiments, the seals 120 and 120' and variations thereof within the present disclosure can be manufactured from other materials.

The seal 120' can be installed and used in the same manner, or in at least a generally similar manner, as the seal 120. Accordingly, although the following discussion relates to the seal 120 for ease of reference, it will be understood to be equally applicable to the seal 120'.

Figure 3A:
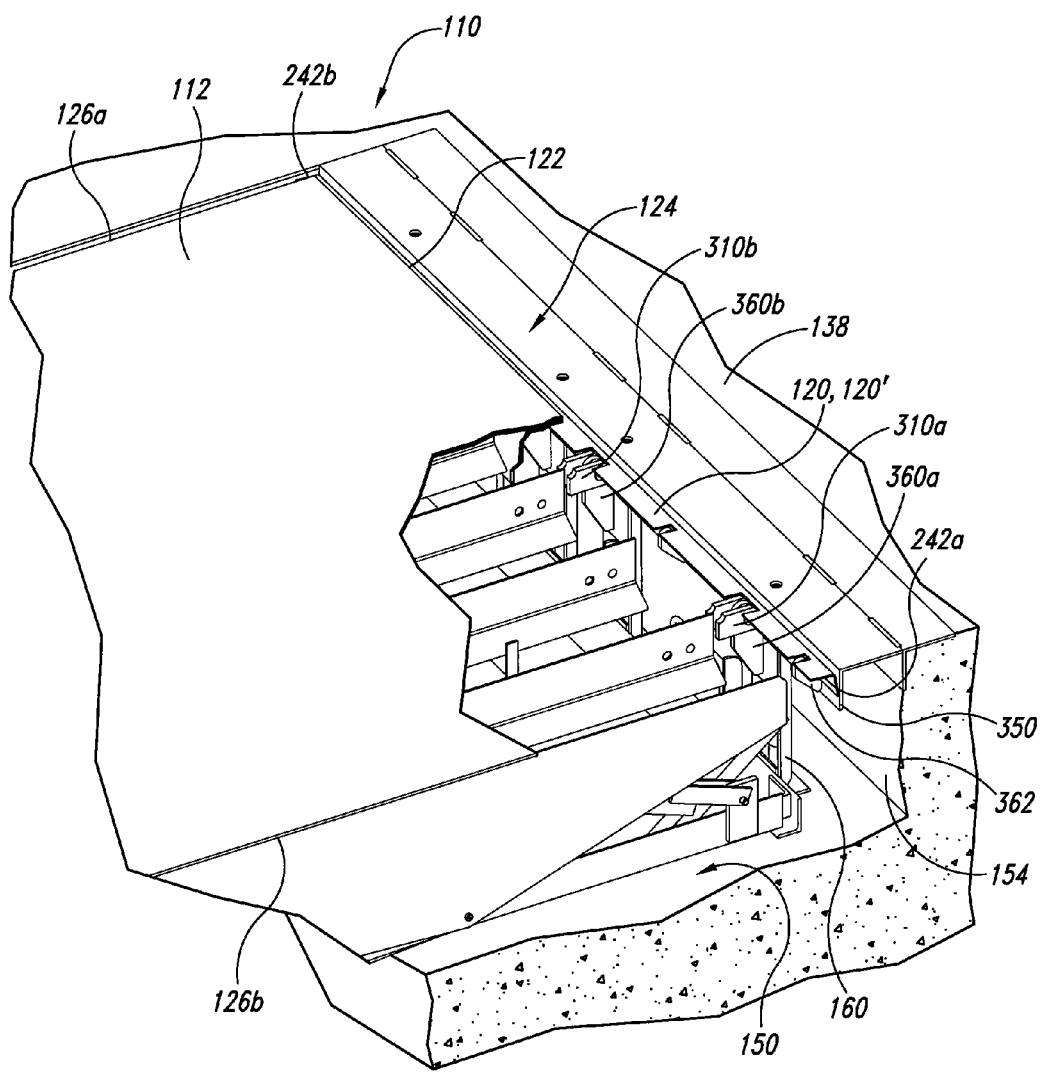
FIGS. 3A and 3B are top and bottom isometric views, respectively, of a rear hinge portion of a dock leveler, illustrating an installation of the deck seal of FIGS. 2A and 2B in accordance with an embodiment of-the disclosure.
Figure 3B:
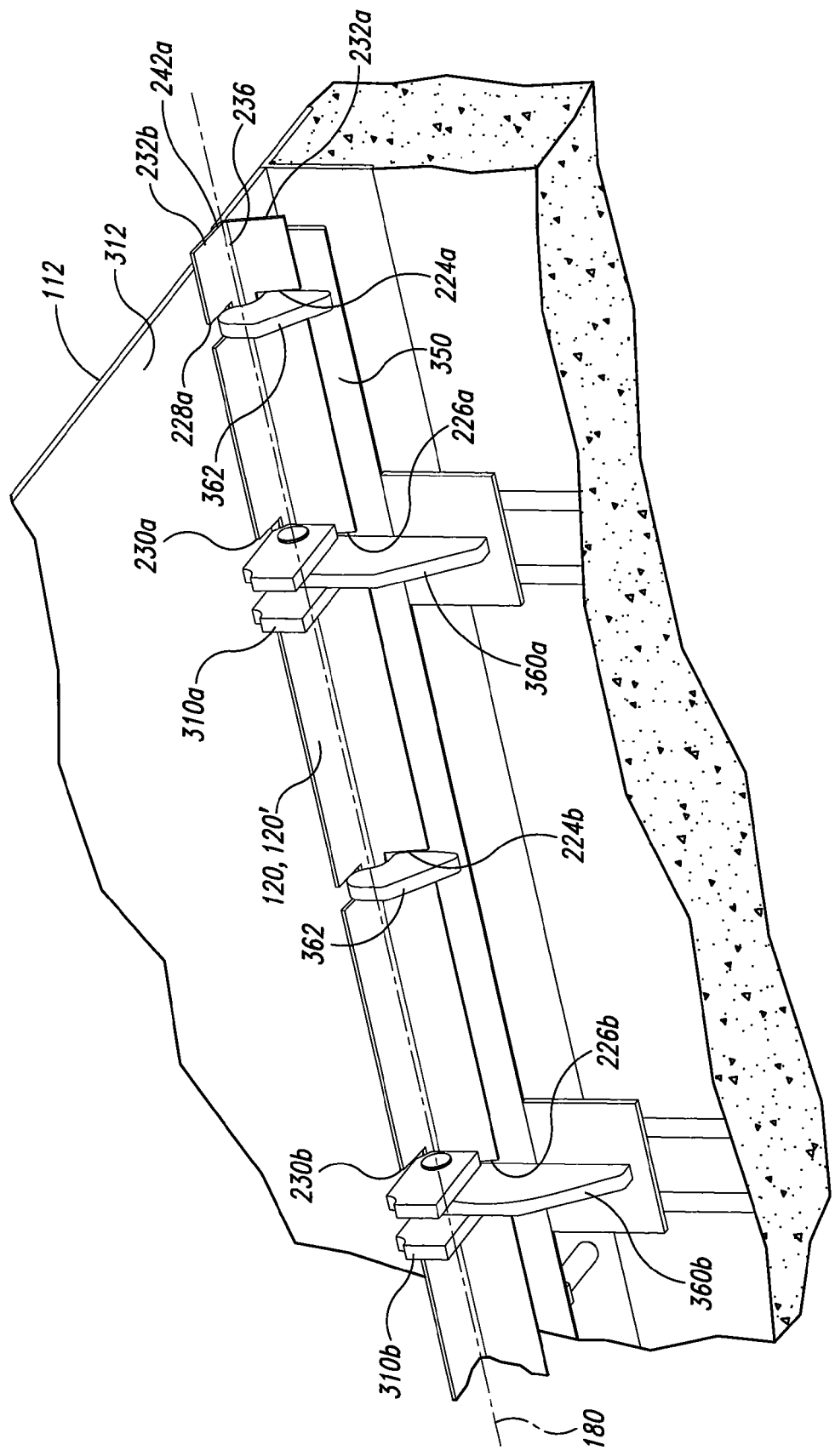

FIG. 3A is a partially cutaway top isometric view of the rear hinge portion of the dock leveler 110, and FIG. 3B is a partially cutaway bottom isometric view of the rear hinge portion. Referring first to FIG. 3A, the hinge support structure 160 includes a rear frame 350 fixedly attached to the rear wall 154 of the dock pit 150 proximate the floor 138 of the building. The seal 120 (or, alternatively, the seal 120') has been positioned in the hinge gap 124, and extends from the first side edge portion 126a of the deck 112 to the second side edge portion 126b.

Referring next to FIG. 3B, the hinge support structure 160 further includes a plurality of first support members 360 (identified individually as first support members 360a and 360*b*) which are fixedly attached to the rear frame 350 and extend outwardly therefrom. The deck 112 includes a plurality of corresponding second support members 310. (identified individually as second support members 310*a* and 310*b*) extending downwardly from a lower surface 312 of the deck 112. The second support members 310 are pivotally coupled to the first support members 360 along the second hinge axis 180 (via, e.g., an axle, pin, rod etc. extending through aligned apertures). This enables the deck 112 to rotate upwardly and away from the pit 150 as described above with reference to FIGS. 1A and 1B. In addition to the first support members 360, the hinge support structure 160 can also include one or more third support members 362 fixedly attached to the rear frame 350. In the illustrated embodiment, the third support members 362 are support blocks that contact the lower surface 312 of the deck 112 to provide additional support and reduce deflection of the deck 112 during use.

To install the seal 120 in the hinge gap 124, the installer (not shown) moves or compresses the first edge portion 232*a* toward the second edge portion 232*b* to bend the seal 120 about the medial portion 236. Bending the seal 120 in this manner enables the installer to move the seal 120 into the gap 124 with the first recesses 224 and the second recesses 226 positioned over the corresponding third support members 362 and first support members 360, respectively, extending from the rear frame 350. Similarly, this enables the installer to position or otherwise fit the fourth recesses 230 around the corresponding second support members 310 extending from the lower surface 312 of the deck 112, and to position the third recesses 228 around the distal end potions of the corresponding third support members 362. In the foregoing manner, the recesses 224, 226, 228 and/or 230 locate, or at least help to locate the seal 120 in the rear hinge gap 124 and hold it in position when it is released by the installer(s).

Figure 4:
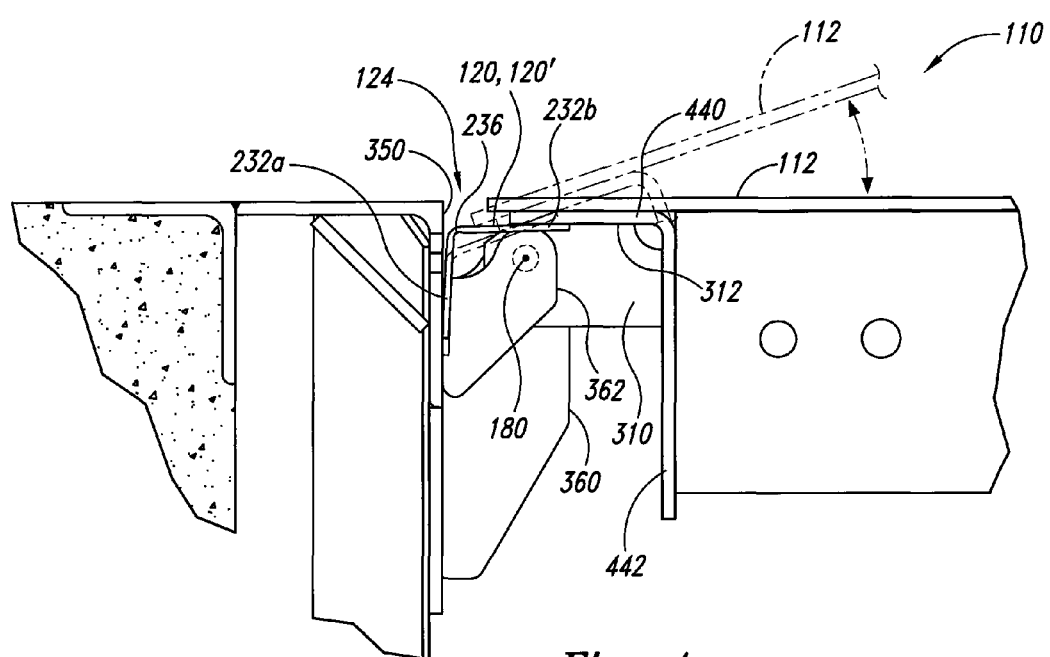
FIG. 4 is a side view of the rear hinge portion of the dock leveler of FIGS. 3A and 3B.

FIG. 4 is an enlarged end view of the rear hinge portion of the dock leveler 110. As this view illustrates, the live hinge created by the medial portion 236 of the seal 120 biases the first edge portion 232*a* against the rear frame 350 and the second edge portion 232*b* against the lower surface 312 of the deck 112. In the illustrated embodiment, the second edge portion 232*b* can actually press against a flange 440 of an angle member 442 that supports the second support members 310. However, for purposes of the present description, the flange 440 against which the second edge portion 232*b* presses can be considered to be part of the lower surface 312 of the deck 112. As is also shown, the first support members 360 and/or the third support members 362 can support the seal 120 and at least partially hold the seal 120 in position in the gap 124.

In the illustrated embodiment, the seal 120 is held in position with the first edge portion 232*a* pressing against the rear frame 350 and the second edge portion 232*b* pressing against the lower surface 312 of the deck 112 without any adhesives, fasteners (e.g., screws), metal clips, and/or other fastening features. The ability of the seal 120 to elastically rebound and lay flat when not under load provides the spring force needed to hold the seal 120 in position once installed. Moreover, the medial portion 236 can create a live hinge that allows the seal 120 to flex as the deck 112 rotates, thereby maintaining a seal, or at least a partial seal, along the longitudinal edge portions 232 of the seal 120 at all times throughout the range of deck rotation. In other embodiments, however, adhesives, fasteners, metal clips, and/or other compounds or features can be used to supplement the natural ability of the seal 120 to hold itself in position or provide a seal.

Although the deck 112 is pivotally attached to the hinge support structure 160 with a lug style hinge formed by coupling the second support members 310 to the first support members 360 along the second hinge axis 180, the seal 120 and variations thereof can also be used with other types of hinge systems without departing from the spirit or scope of the present disclosure. Such hinge systems can include, for example, other lug style hinges, piano style hinges (e.g., hinges that include one or more concentric tubes through with a hinge pin passes, and hinges that include both lugs and piano style tubes. As those of ordinary skill in the art will appreciate, various embodiments of the seals described herein can be used with virtually any type of deck hinge by simply varying the sizes and/or positions of the recesses in the side edge portions as needed to accommodate the arrangement of hinge lugs, tubes, supports, etc. which make up the particular hinge.

Figure 5:
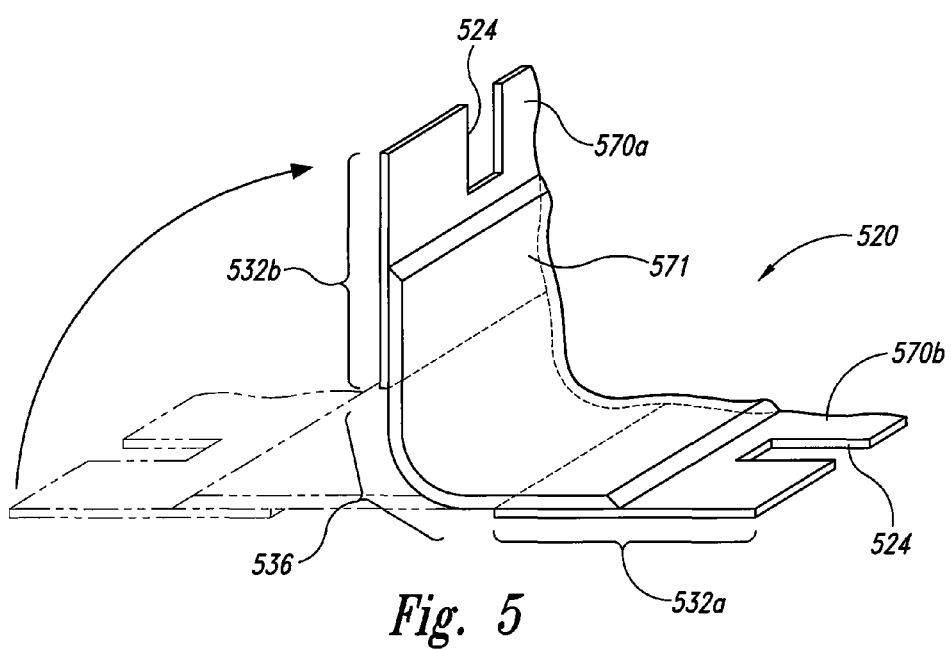
FIG. 5 is a partially cutaway isometric view of a dock leveler seal configured in accordance with another embodiment of the disclosure.

FIG. 5 is an isometric end view of a seal 520 constructed from multiple pieces of material in accordance with another embodiment of the disclosure. Many features of the seal 520 can be at least generally similar in structure and function to corresponding features of the seal 120 described above. In the embodiment of FIG. 5, however, the seal 520 includes an intermediate member 571 bonded, fastened, or otherwise attached to a first side or edge member 570*a* and a second edge member 570*b*. The intermediate member 571 can be made from a material that is resilient and has memory, but is more rigid than the material used to manufacture the edge members 570. For example, in one embodiment the intermediate material 571 can be made from steel (e.g., spring steel) and the edge members 570 can be made from various types of rubber, polymeric materials, and/or other elastomeric materials. In another embodiment, the intermediate member 571 can be made from a first elastomeric material having a first stiffness, and the edge members 570 can be manufactured from a second elastomeric material having a second stiffness that is less than the first stiffness. In yet further embodiments, the intermediate member 571 can be less stiff than the edge members 570.

Like the seal 120 described in detail above with reference to FIGS. 1A-4, the seal 520 can lie flat, or at least generally flat, in the free or relaxed state. For installation, first and second edge portions 532*a*, 532*b* of the seal 520 can then be bent about a medial portion 536 to fit the seal 520 between the rear hinge gap 124 (see, e.g., FIGS. 3A-4). As with the seal 120, the seal 520 can include a plurality of notches, cutouts or recesses 524 to accommodate the corresponding support members on the aft edge portion 122 of the deck 112 and the rear frame 350.

From the foregoing, it will be appreciated that specific embodiments have been described herein for purposes of illustration, but that the disclosure encompasses additional embodiments as well. For example, although the seals 120 and 520 have been described above in the context of rear hinge gaps, in other embodiments, the seals 120 and 520, and/or variations thereof can be used to seal other gaps between the deck 112 and adjacent surfaces or structures. For example, in one embodiment the seals 120 and/or 520 can be used to seal the gaps between the side members 116 and the side walls 152 of the deck pit 150. In another embodiment, the seals 120 and/or 520 can be used to seal the gap between the deck 112 and the front lip 114. In certain other embodiments, the seals 120 and/or 520 can be used to seal a gap between a rear edge portion of a deck and the rear wall of the pit. Such embodiments may be employed, for example, in those instances in which the dock leveler lacks a rear frame and/or a rear hinge arrangement similar to that disclosed herein. In still further embodiments, the seals 120 and/or 520 can be used to seal a gap between a rear edge portion of a verticalstoring deck and a loading dock floor. Accordingly, the various embodiments of seals described herein are not limited to use with dock leveler deck rear hinge gaps, but can also be used in other leveler applications consistent with the present disclosure.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, the disclosure is not limited, except as by the appended claims.

We claim:

1. A dock leveler for use with a loading dock, the dock leveler comprising:
   a support structure configured to be fixedly positioned in a dock leveler pit at least proximate to a rear wall thereof, wherein the support structure includes a plurality of first support members extending therefrom;
   a deck having a front edge portion opposite an aft edge portion, and a first side edge portion opposite a second side edge portion, wherein the aft edge portion includes a plurality of second support members pivotally coupled to the first support members along an axis, and wherein the deck is pivotable about the axis between a lower position in which the front edge portion is positioned proximate the dock leveler pit and an upper position in which the front edge portion is positioned above the dock leveler pit; and
   a resilient seal positioned between the support structure and the aft edge portion of the deck, wherein the seal includes:
      a first end portion positioned at least proximate to the first side edge portion of the deck and a second end portion positioned at least proximate to the second side edge portion of the deck;
      a medial portion extending longitudinally between the first and second end portions;
      a first edge portion extending outwardly from the medial portion in a first direction, wherein the first edge portion includes a plurality of recesses formed therein, wherein each of the first support members extends at least partially into a corresponding one of the recesses, and wherein the seal is supported by the plurality of first support members; and
      a second edge portion extending outwardly from the medial portion in a second direction, wherein the medial portion urges the first edge portion against the support structure and the second edge portion against the aft edge portion of the deck when the deck is in the lower position and when the deck is in the upper position.

2. The dock leveler of claim 1 wherein the plurality of recesses formed in the first edge portion of the seal includes a plurality of first recesses wherein the second edge portion of the seal includes a plurality of second recesses formed therein, and wherein each of the second support members extends at least partially into a corresponding one of the second recesses.

3. The dock leveler of claim 1 wherein the medial portion of the seal is spring-loaded when the seal is positioned between the support structure and the aft edge portion of the deck.

4. The dock leveler of claim 1 wherein the medial portion of the seal includes an undercut region that forms a hinge.

5. The dock leveler of claim 1 wherein the seal is a one-piece seal that lies substantially flat prior to installation between the support structure and the aft edge portion of the deck.

6. The dock leveler of claim 1, further comprising a lip operably coupled to the forward edge portion of the deck and configured to contact a bed of a freight vehicle.

7. A dock leveler system for use with a loading dock, the loading dock having a dock leveler pit with a rear wall, a first side wall, and a second side wall opposite the first side wall, the dock leveler system comprising:
   a support frame configured to be fixedly attached to the rear wall of the dock leveler pit;
   a plurality of first support members fixedly attached to the support frame and extending outwardly therefrom;
   a deck having an aft edge portion spaced apart from the support frame to define a gap therebetween;
   a plurality of second support members fixedly attached to a lower surface of the deck proximate the aft edge portion, wherein the second support members are pivotally coupled to the first support members along an axis; and
   a resilient seal that includes:
      an intermediate portion extending longitudinally in the gap between the support frame and the aft edge portion of the deck;
      a first edge portion extending outwardly from the intermediate portion in a first direction, wherein the first edge portion includes a plurality of recesses formed therein, wherein at least a portion of each of the first support members is positioned in a corresponding one of the recesses, and wherein the seal is at least partially supported by at least one of the first support members; and
      a second edge portion extending outwardly from the intermediate portion in a second direction, wherein the first edge portion presses against the support frame and the second edge portion presses against the lower surface of the deck when the deck pivots about the axis between a lower position in which the deck substantially covers the dock leveler pit and an upper position in which a front edge portion of the deck is raised above the dock leveler pit.

8. The dock leveler system of claim 7 wherein the seal further includes a first end portion configured to be positioned at least proximate to the first side wall of the dock leveler pit and a second end portion configured to be positioned at least proximate to the second side wall of the dock leveler pit.

9. The dock leveler system of claim 7 wherein the first edge portion of the seal has a first thickness, the second edge portion of the seal has a second thickness, and the intermediate portion of the seal has a third thickness that is less than the first and second thicknesses.

10. The dock leveler system of claim 7 wherein the seal is held in position by the plurality of first support members and the plurality of second support members.

11. The dock leveler system of claim 7 wherein the intermediate portion of the seal is a live hinge formed of an elastic material.

12. The dock leveler system of claim 7 wherein the first edge portion, the second edge portion, and the intermediate portion of the seal comprise a single, unitary member.

13. The dock leveler system of claim 7 wherein the intermediate portion of the seal is formed from a first material and the first edge portion of the seal is formed from a second material, different than the first material.

14. The dock leveler system of claim 7 wherein the intermediate portion of the seal is formed from a first material having a first stiffness, and wherein the first edge portion of the seal is formed from a second material having a second stiffness that is less than the first stiffness.

15. A method for sealing an elongate gap between a first dock leveler structure and a second dock leveler structure, the method comprising:
   providing a substantially flat seal, wherein the seal includes:
      a first end portion spaced apart from a second end portion;
      a medial portion extending longitudinally between the first and second end portions;
      a first edge portion extending outwardly from the medial portion in a first direction; and
      a second edge portion extending outwardly from the medial portion in a second direction;
   bending the seal about the medial portion to move the first edge portion toward the second edge portion;
   positioning the first edge portion of the seal against the first dock leveler structure, wherein positioning the first edge portion of the seal against the first dock leveler structure includes positioning a plurality of first cutouts in the first edge portion around a plurality of first members on a rear hinge frame;
   positioning the second edge portion of the seal against the second dock leveler structure, wherein positioning the second edge portion of the seal against the second dock leveler structure includes positioning a plurality of second cutouts in the second edge portion around a plurality of second members on an aft edge portion of a movable deck that is pivotally coupled to the rear hinge frame; and
   releasing the seal in the elongate gap, whereby the first edge portion presses outwardly against the first dock leveler structure and the second edge portion presses outwardly against the second dock leveler structure, and whereby the seal is at least partially supported by at least one of the first members or the second members.

16. The method of claim 15 wherein the first dock leveler structure is a support frame and the second dock leveler structure is a deck pivotally coupled to the support frame, wherein the deck has a first side edge opposite a second side edge, and wherein the method further comprises releasing the seal in the elongate gap so that the first end portion of the seal is positioned at least proximate to the first side edge of the deck and the second end portion of the seal at least proximate to the second side edge of the deck.

17. The method of claim 15, further comprising, after bending the seal about the medial portion, inserting the seal downwardly through the elongate gap to position the plurality of first cutouts in the first edge portion of the seal around the plurality of first members on the rear hinge frame, and to position the plurality of second cutouts in the second edge portion of the seal around the plurality of second members on the aft edge portion of the movable deck.

18. A dock leveler for use with a loading dock, the dock leveler comprising:
   a support structure configured to be fixedly positioned in a dock leveler pit at least proximate to a rear wall thereof, wherein the support structure includes a plurality of first support members extending therefrom;
   a deck having a front edge portion opposite an aft edge portion, and a first side edge portion opposite a second side edge portion, wherein the aft edge portion includes a plurality of second support members pivotally coupled to the first support members along an axis, and wherein the deck is pivotable about the axis between a lower position in which the front edge portion is positioned proximate the dock leveler pit and an upper position in which the front edge portion is positioned above the dock leveler pit; and
   a resilient seal positioned between the support structure and the aft edge portion of the deck, wherein the seal includes:
      a first end portion positioned at least proximate to the first side edge portion of the deck and a second end portion positioned at least proximate to the second side edge portion of the deck;
      a medial portion extending longitudinally between the first and second end portions;
      a first edge portion extending outwardly from the medial portion in a first direction; and
      a second edge portion extending outwardly from the medial portion in a second direction, wherein the medial portion urges the first edge portion against the support structure and the second edge portion against the aft edge portion of the deck when the deck is in the lower position and when the deck is in the upper position;
      wherein at least one of the first edge portion and the second edge portion includes a plurality of recesses formed therein, and wherein individual ones of the first support members or the second support members extend at least partially into the recesses to retain the seal in position between the support structure and the aft edge portion of the deck.

19. The dock leveler of claim 18 wherein the medial portion of the seal is spring-loaded when the seal is positioned between the support structure and the aft edge portion of the deck.

20. The dock leveler of claim 18 wherein the medial portion of the seal includes an undercut region that forms a hinge.

21. The dock leveler of claim 18 wherein the seal is a one-piece seal that lies substantially flat prior to installation between the support structure and the aft edge portion of the deck.

* * * * *

UNITED STATES PATENT AND TRADEMARK OFFICE
CERTIFICATE OF CORRECTION

PATENT NO.        : 8,046,857 B2
APPLICATION NO.   : 12/424379
DATED             : November 1, 2011
INVENTOR(S)       : L. Blake Whitley et al.

It is certified that error appears in the above-identified patent and that said Letters Patent is hereby corrected as shown below:

On Title page 2, Item (56), under "Other Publications", line 19, delete "Intructions," and insert -- Instructions, --, therefor.

In column 2, line 56, delete "of-the" and insert -- of the --, therefor.

In column 5, line 57, after "reference." insert -- As those of ordinary skill in the art will appreciate, however, the various embodiments of the present disclosure are not limited to the particular types of sidewall and front seals discussed above. Accordingly, other suitable side and front seals known in the art can be utilized with the dock leveler 110 without departing from the present disclosure. --.

In column 8, line 30, delete "eFH/AD" and insert -- FH/AD --, therefor.

In column 9, line 3, delete "310." and insert -- 310 --, therefor.

In column 11, line 57, in claim 2, delete "recesses" and insert -- recesses, --, therefor.

Signed and Sealed this
Fourteenth Day of February, 2012

David J. Kappos
*Director of the United States Patent and Trademark Office*